(12) United States Patent
Daughrity et al.

(10) Patent No.: US 11,611,122 B2
(45) Date of Patent: Mar. 21, 2023

(54) ELECTRIC VEHICLE BATTERY COOLANT HEATER ASSEMBLY WITH ELECTRICAL CONNECTION THROUGH GASKET

(71) Applicant: Dana Automotive Systems Group, LLC, Maumee, OH (US)

(72) Inventors: Timothy W. Daughrity, Murray, KY (US); Christopher M. Cook, McKenzie, TN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 158 days.

(21) Appl. No.: 16/921,792

(22) Filed: Jul. 6, 2020

(65) Prior Publication Data

US 2022/0006141 A1 Jan. 6, 2022

(51) Int. Cl.
| | |
|---|---|
| *H01M 10/6567* | (2014.01) |
| *B60L 50/64* | (2019.01) |
| *B60L 58/26* | (2019.01) |
| *B60L 58/27* | (2019.01) |
| *F28F 9/02* | (2006.01) |
| *H01M 10/613* | (2014.01) |
| *H01M 10/615* | (2014.01) |
| *H01M 10/625* | (2014.01) |
| *F28F 3/12* | (2006.01) |

(52) U.S. Cl.
CPC ......... *H01M 10/6567* (2015.04); *B60L 50/64* (2019.02); *B60L 58/26* (2019.02); *B60L 58/27* (2019.02); *F28F 3/12* (2013.01); *F28F 9/0219* (2013.01); *H01M 10/613* (2015.04); *H01M 10/615* (2015.04); *H01M 10/625* (2015.04); *H01M 2220/20* (2013.01)

(58) Field of Classification Search
CPC ........... H01M 10/6567; H01M 10/613; H01M 10/615; H01M 10/625; H01M 2220/20; H01M 10/6556; B60L 50/64; B60L 58/26; B60L 58/27; F28F 3/12; F28F 9/0219

See application file for complete search history.

(56) References Cited

U.S. PATENT DOCUMENTS

| | | | |
|---|---|---|---|
| 5,035,637 | A | 7/1991 | Mathews et al. |
| 8,315,040 | B2 | 11/2012 | Roberts et al. |
| 9,324,980 | B1 | 4/2016 | Goulden et al. |
| 10,049,963 | B2 | 8/2018 | Menon et al. |
| 2004/0253867 | A1 | 12/2004 | Matsumoto |
| 2019/0058227 | A1* | 2/2019 | Thomas ............. H01M 10/613 |

FOREIGN PATENT DOCUMENTS

| | | |
|---|---|---|
| GB | 2385665 A | 8/2003 |
| JP | 2018101872 A | 6/2018 |
| KR | 20030085712 A | 11/2003 |

* cited by examiner

*Primary Examiner* — Adam A Arciero
(74) *Attorney, Agent, or Firm* — McCoy Russell LLP

(57) ABSTRACT

A battery coolant heater assembly including a coolant manifold having liquid coolant pathways and a heat transfer surface for transferring heat to liquid coolant flowable within the coolant manifold, an electric heater element thermally contacted to the heat transfer surface of the manifold, and a cover sealably enclosing the heating element between the heat transfer surface and the cover via a gasket. The electric heater element is electrically connected via an electrical connector extending through and formed integrally with the gasket.

20 Claims, 3 Drawing Sheets

ELECTRIC VEHICLE BATTERY COOLANT HEATER ASSEMBLY WITH ELECTRICAL CONNECTION THROUGH GASKET

FIELD

The present disclosure relates to electric vehicle (EV) component assemblies and electrical connections therefor, and, more particularly, to methods and systems for an EV battery coolant heater assembly with electrical connection through a component gasket.

BACKGROUND AND SUMMARY

Electric vehicles and electric hybrid vehicles make use of batteries that are sensitive to temperature. To maintain the batteries at optimum temperatures, battery cooling plates are used, which are in thermal contact with the battery pack and incorporate fluid paths through which coolant is directed. The battery cooling system typically includes a coolant pump for moving coolant through the battery cooling plates, a chiller for reducing the temperature of the coolant fluid when needed, and a battery coolant heater for increasing the temperature of the coolant fluid to improve battery life. Each of these components includes coolant flow paths and electrical connections, and the components are typically positioned and configured within a particular vehicle according to specific space (or packaging) and thermal management requirements for the battery cooling system that depend on the specific geometries for a particular vehicle.

The battery coolant heater includes a coolant manifold through which the coolant fluid flows, an electric heating element, and a cover. Current component wiring solutions for providing electrical power to the heating element require a separate harness plug installed on the battery coolant heater cover. The harness plug (or harness connector) is installed in a hole in the cover, and wiring extends through the hole into the enclosed space to provide electric power to the heating element. The cover includes enough depth to accommodate both the harness connector dimensions and enough additional wiring length to allow threading the wiring through the hole in the cover, securably and sealably installing the connector within the cover through hole, extending the wiring toward the heating element for electrically connecting/powering the heating element, and, finally, closing the cover over the coolant manifold. However, the design has disadvantages. The cover depth creates additional (unnecessarily large) packaging requirements. The harness connector cover through hole creates an additional leak path (into an otherwise sealed enclosure). Further, the design is difficult to assemble, requiring additional and awkward steps, for example, having to thread wiring through the cover and either bringing the cover and connector wiring close enough to the heater element and manifold for electrically connecting the heater element, or bringing the heating element close enough toward the cover and connector wiring to electrically connect the heater element, before enclosing the cover over the heating element and manifold. Accordingly, there is a need for improved battery coolant heater assembly designs and methods.

To address at least some of the aforementioned and other problems, embodiments for a battery coolant heater assembly are provided. According to a first aspect of the disclosure is a battery coolant heater assembly comprising: a coolant manifold having liquid coolant pathways and at least one heat transfer surface for transferring heat to liquid coolant flowable within the coolant manifold; at least one electric heater element thermally contacted to the at least one heat transfer surface; and a cover sealably enclosing the at least one heating element between the at least one heat transfer surface and the cover via a gasket between the cover and the at least one heat transfer surface, the at least one electric heater element electrically connected to at least one electrical connector extending through and formed integrally with the gasket.

According to another aspect, the coolant manifold includes a gasket mounting substrate circumscribing an area of the heat transfer surface and the electric heater element thermally contacted thereto.

According to another aspect, the gasket is positioned upon the gasket mounting substrate so as to fully circumscribe the area of the heat transfer surface and the electric heater element positioned therein.

According to another aspect, the cover includes a gasket engaging surface sized to match the gasket and sealably engage with the gasket and the gasket mounting substrate there below.

According to another aspect, the cover, due to electrical conductors extending through the at least one gasket-integral electrical connector extending through and formed integrally with the gasket, is free from any through hole sized and adapted to receive a non-gasket-integral electrical harness connector for providing power or electrical signals to the at least one heating element, such that a depth of the cover is decreased by at least a portion of a depth-wise dimension of the non-gasket-integral electrical harness connector.

According to another aspect, the gasket includes a carrier rail, the carrier rail having a pair of sides and a channel depression between the carrier rail sides.

According to another aspect, the gasket includes a molded-in harness mating connector shroud, the molded-in harness mating connector shroud molded into an outside edge of the gasket leaving the carrier rail oriented inward from the molded-in harness mating connector so that the molded-in harness mating connector shroud is exposed outside of space enclosed by the cover when sealably enclosing the at least one heating element between the at least one heat transfer surface and the cover.

According to another aspect, an integrated or cure-in-place sealing bead is positioned within the channel depression of the carrier rail.

According to another aspect, metallic pin circuitry extends between electrical conductors exposed and oriented within the molded-in harness mating connector shroud through the carrier rail so that ends of the electrical conductors opposite the connector shroud are positioned within the space enclosed by the cover when sealably enclosing the at least one heating element, with the metallic pic circuitry adapted for providing electrical power or electrical signals to the at least one heating element.

According to another aspect, the electrical conductors positioned within the space are adapted with spade terminal connectors for electrical connection with correspondingly mating spade terminal connectors of the at least one heating element.

According to another aspect, the electrical conductors positioned with in the space are adapted with wire conductors for electrical connection with the at least one heating element.

According to a second aspect of the disclosure is a method of assembling an electric vehicle battery coolant heater assembly, the method comprising: providing a coolant manifold including liquid coolant pathways and at least one heat transfer surface for transferring heat to liquid coolant flowable within the coolant manifold, at least one electric heater element thermally contactable to the at least one heat transfer surface, and a cover for sealably enclosing the at least one heating element between the at least one heat transfer surface and the cover via a gasket between the cover and the at least one heat transfer surface, the at least one electric heater element electrically connectable to at least one electrical connector extending through and formed integrally with the gasket; placing the at least one electric heater element upon the at least one heat transfer surface so that the at least one electric heater element is thermally contacted to the at least one heat transfer surface and heat transferable from the at least one heater element is transferable to the liquid coolant flowable within the coolant manifold; placing the gasket with the at least one integral electrical connector on the coolant manifold so as to circumscribe the at least one heater element and the at least one heat transfer surface there below; connecting electrical conductors extending from the at least one electrical connector extending through and formed integrally with the gasket with corresponding mating electrical connections of the at least one heater element; and placing the cover upon the gasket and sealably enclosing the at least one heating element between the at least one heat transfer surface and the cover.

According to another aspect, the coolant manifold includes a gasket mounting substrate circumscribing an area of the heat transfer surface and the electric heater element thermally contacted thereto.

According to another aspect, the gasket is positioned upon the gasket mounting substrate so as to fully circumscribe the area of the heat transfer surface and the electric heater element positioned therein.

According to another aspect, the cover includes a gasket engaging surface sized to match the gasket and sealably engage with the gasket and the gasket mounting substrate there below.

According to another aspect, the cover, due to electrical conductors extending through the at least one gasket-integral electrical connector extending through and formed integrally with the gasket, is free from any through hole sized and adapted to receive a non-gasket-integral electrical harness connector for providing power or electrical signals to the at least one heating element, such that a depth of the cover is decreased by at least a portion of a depth-wise dimension of the non-gasket-integral electrical harness connector.

According to a third aspect, a gasket with at least one integral electrical connector adapted for a battery coolant heater assembly, the gasket comprising: a gasket seal adapted to sealably enclose at least one battery coolant heating element between at least one heat transfer surface of a battery coolant manifold having liquid coolant pathways therewithin and a cover; and at least one electrical connector extending through and formed integrally with the gasket seal so as to provide power or electric signals to the at least one battery coolant heating element sealably enclosed within a space between the cover and the at least one heat transfer surface of the battery coolant manifold.

According to another aspect, the gasket seal includes a carrier rail, the carrier rail having a pair of sides and a channel depression between the carrier rail sides.

According to another aspect, the gasket includes a molded-in harness mating connector shroud, the molded-in harness mating connector shroud molded into an outside edge of the gasket seal leaving the carrier rail oriented inward from the molded-in harness mating connector so that the molded-in harness matting connector shroud is exposed outside of the space enclosed by the cover when sealably enclosing the at least one heating element between the at least one heat transfer surface and the cover.

According to another aspect, an integrated or cure-in-place sealing bead is positioned within the channel depression of the carrier rail.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1-6 are shown with components in proportional size with one another, according to some embodiments.

DETAILED DESCRIPTION

Figure 1:
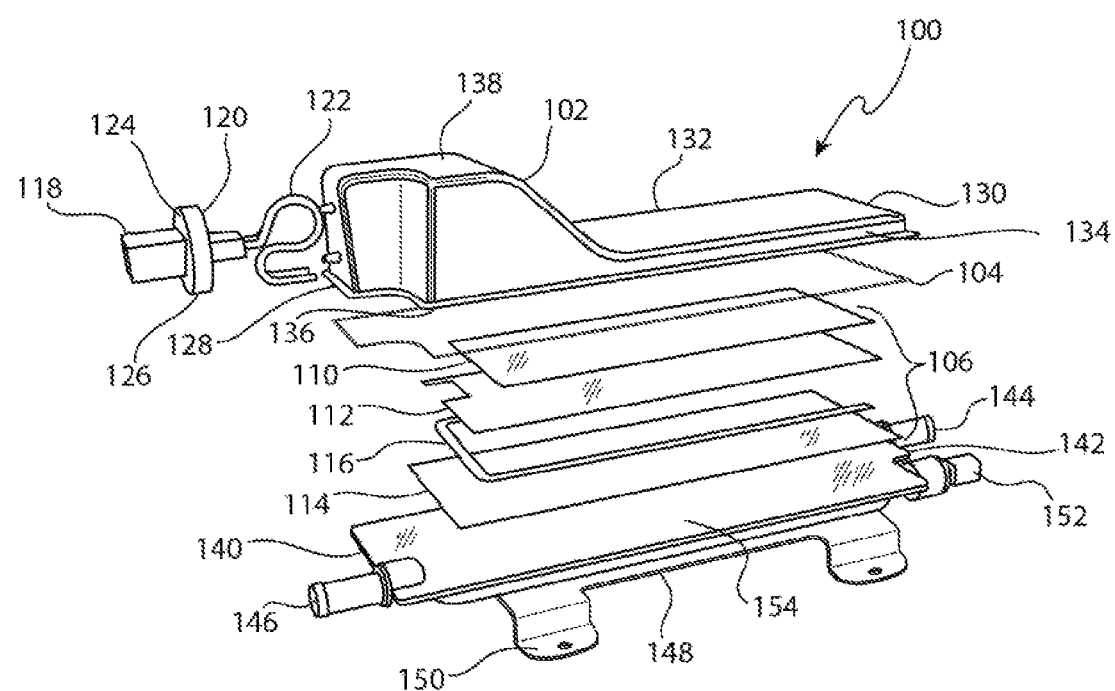
FIG. 1 is an exploded perspective view of an exemplary electric vehicle battery coolant heater assembly comprising components according to various embodiments.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 2:
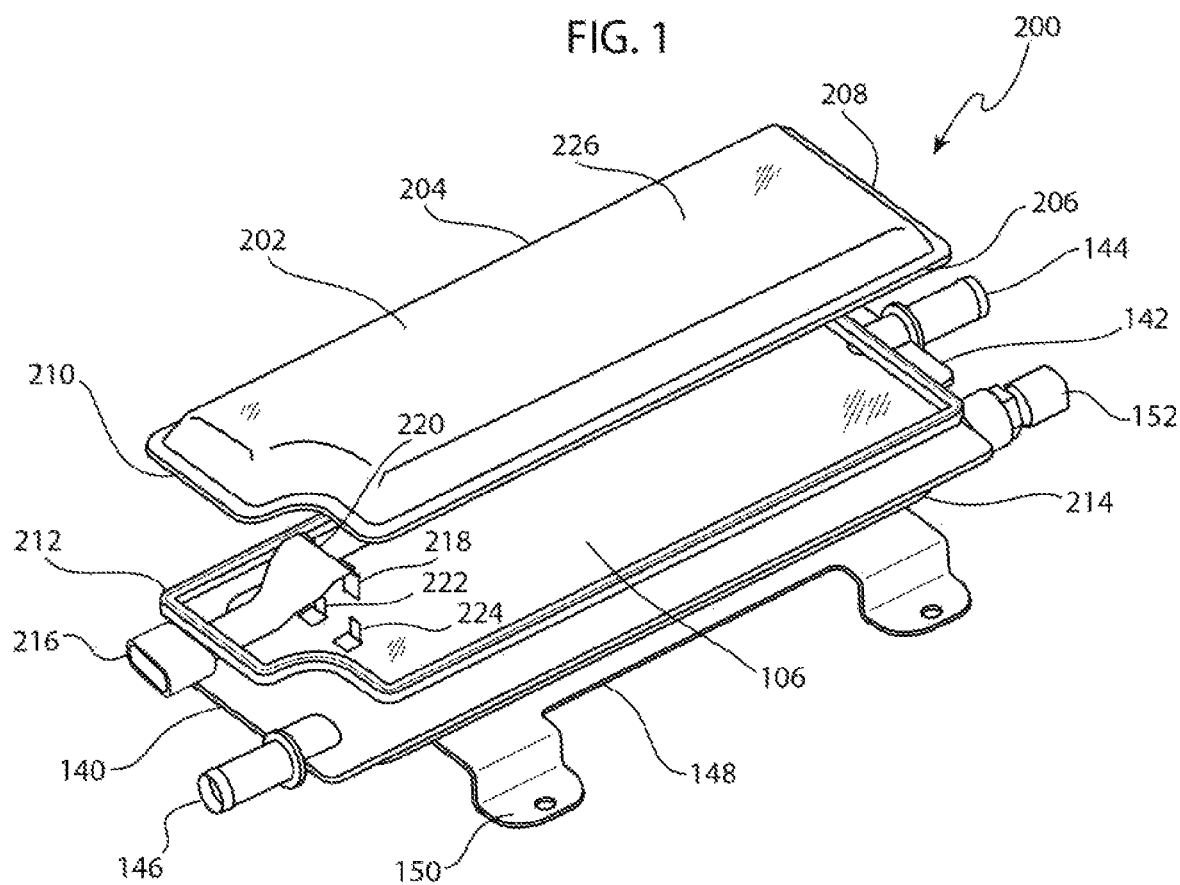
FIG. 2 is an exploded perspective view of an exemplary electric vehicle battery coolant heater assembly comprising a reduced height (depth) cover and sealing gasket with integral pass-through electrical connections, according to various embodiments.
Figure 3:
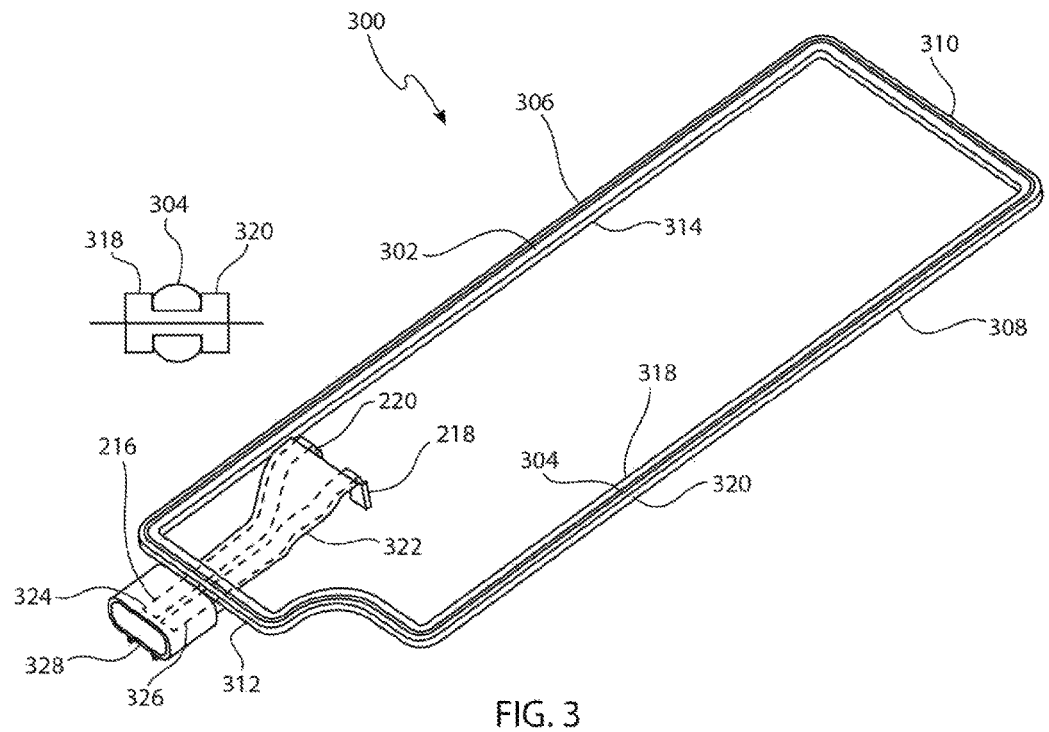
FIG. 3 is a perspective view of an exemplary gasket with integral pass-through electrical connections, according to various embodiments.
Figure 4:
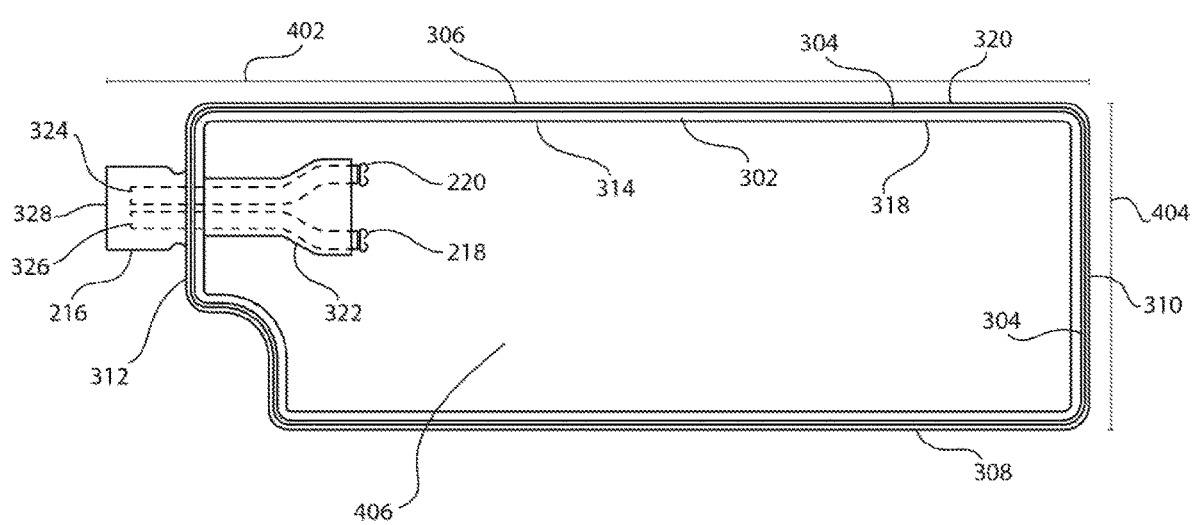
FIG. 4 is a top plan view of the gasket with integral pass-through electrical connections shown in FIG. 3.
Figure 5:
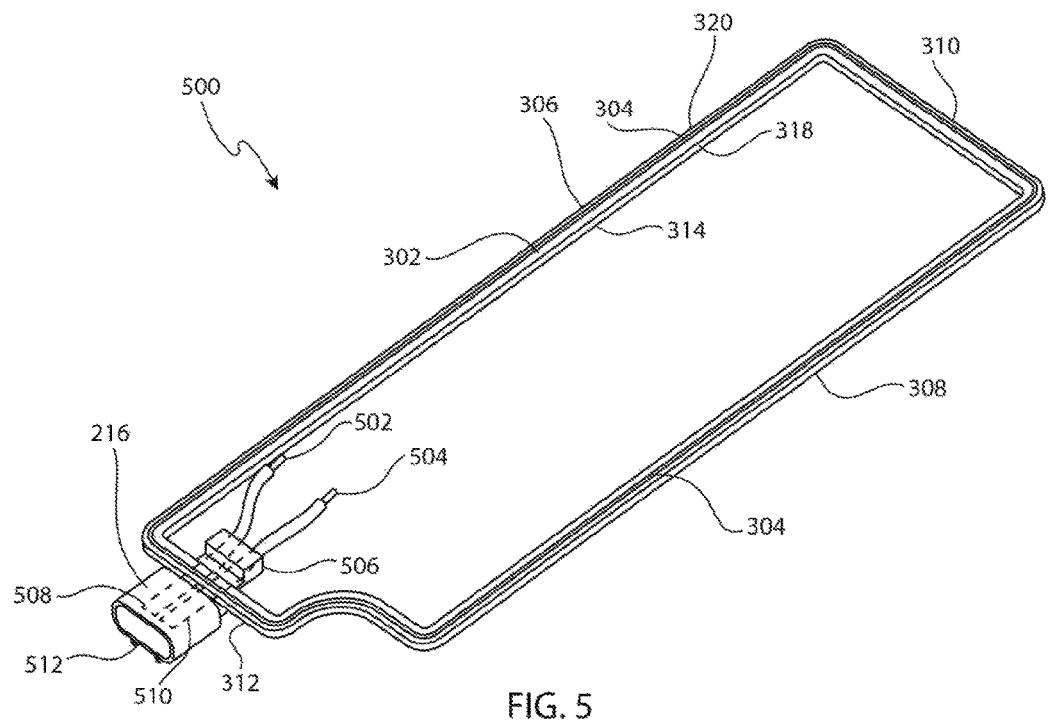
FIG. 5 is a perspective view of an exemplary gasket with integral pass-through electrical connections, according to some embodiments.
Figure 6:
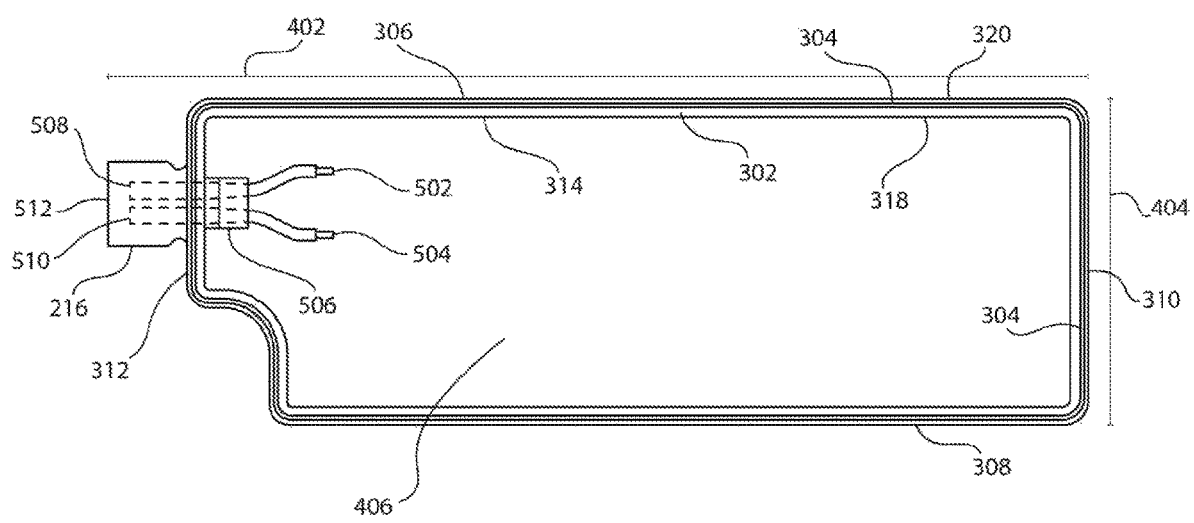
FIG. 6 is a top plan view of the gasket with integral pass-through electrical connections shown in FIG. 5.

As an overview, FIG. 1 illustrates an exemplary electric vehicle battery coolant heater assembly comprising a component cover, an electrical component (e.g., at least one heating element), a battery coolant manifold, and a gasket, wherein the cover includes a through hole with separate harness connector and lengths of wiring for electrical connection with the electrical component. FIG. 2 illustrates an exemplary electric vehicle battery heater assembly comprising a substantially depth reduced (height reduced) cover and a gasket having integral pass-through electrical connections. FIGS. 3-4 illustrate the gasket in FIG. 2 in greater detail. FIGS. 5-6 illustrate a gasket having integral pass-through electrical connections according to alternate embodiments.

Although the embodiments may be described in detail in the context of an electric vehicle battery coolant heater assembly, various embodiments and/or various aspects of the embodiments described may be separable and may be applied in other electric vehicle components, other vehicle components for non-electric vehicles, or other components for non-automotive applications. For example, aspects of the embodiments described, or aspects of portions of those embodiments, may be applied to a component having an electrical component sealably enclosed between a cover and a component mounting/attachment substrate (to which the electrical component is mounted/attached), with a power/signal pass-through configuration that is integrated into the sealing gasket between the cover and component/attachment substrate. As another example, aspects of the embodiments described, such as the substantially planar cover opening with correspondingly substantially planar sealing gasket and substantially planar component mounting/attachment substrate surfaces (arranged in parallel to one another), may be formed with different geometries. For example, the cover opening, gasket, and component mounting/attachment substrate may not be substantially planar (as shown and described) but may be, instead, comprise matingly correspoding non-planar shapes that are configured to sealably attach to one another to provide a sealable enclosure for the enclosed electrical component.

The exploded perspective view shown in FIG. 1 is that of an exemplary electric vehicle battery coolant heater assembly 100 comprising components according to various embodiments. As shown, the battery coolant heater assembly 100 comprises a component cover 102 that extends lengthwise between an end 128 and an opposite end 130, and widthwise between an edge 132 and an opposite edge 134, and depth-wise between a lower edge 136 and an upper surface 138. In one embodiment, the edges 134 and 132 extending between ends 128 and 130 define a substantially planar opening sized and configured to receive a correspondingly sized gasket 104 for sealing the cover 102 to correspondingly sized substrate gasket mounting surfaces of a component mounting/attachment substrate or, as shown, coolant manifold 108. The coolant manifold 108 preferably comprises a substantially planar heat transfer surface 154 that extends lengthwise within an area between an end 140 and an opposite end 142, and widthwise between edges corresponding with edges 134 and 132.

The cover 102, as shown, includes a depth (or height) between lower edge 136 and top surface 138 that is no less than the depth-wise dimension 126-124 of a separate harness connector 118. The depth-wise dimension 126-124 of the separate harness connector 118 extends from a lower end 126 to an upper end 124. The harness connector 118 includes a harness connector gasket 120 and a length of wire 122 extending from the harness connector gasket 120.

The length of wire 122 is shown in FIG. 1 in an S-shaped configuration, which is a collapsed configuration of the length of wire 122 when positioned within the portion of the cover 102 having the depth (height) between lower edge 136 and top surface 138. When the separate harness connector 118 and the length of wire 122 extending therefrom is inserted into a through hole in the cover 102 (shown in the side wall just above the end 128 of the cover 102), the length of wire 122 is of sufficient length to be pulled through the through hole and downward from the opening of the cover (between ends 128 and 130, and edges 134 and 132) so as to electrically connect with electrical connections 116 associated with the electrical component 106. Once the cover 102 is sealably engaged with gasket 104 and correspondingly mating surfaces of the coolant manifold 108, the length of wire 122 is forced to fold up (collapse) into the depth (height) 136-138 area of the cover 102. The depth (height) 136-138 of the cover 102 is, as shown, sufficient so as to accommodate the length of wire 122 needed for the manufacturing steps needed to pull the length of wire 122 through the through hole in the cover 102, insert the separate harness connector 118 to the cover 102, make the electrical connections to the electrical component 106, and place the gasket 104 between corresponding edges/surfaces of the cover and coolant manifold.

The electrical component 106 preferably comprises one or more heating elements, and the one or more heating elements may comprise various layers 114, 112, 110 and associated electrical circuitry and connections 116. In various embodiments, the electrical component 106 comprises at least one heating element adapted to contact a heat transfer surface 154 of the coolant manifold 108. In one embodiment, the at least one heating element comprises a substantially planar component that is sized and configured to be thermally coupled to the heat transfer surface 154. In one embodiment, the layers and components 110, 112, 114, and 116 combine to form at least one heating element comprising the electrical component 106.

The coolant manifold 108, as shown, comprises coolant flow ports 146 and 144 for receiving coolant fluid (heating fluid) into fluid paths within the manifold and exhausting coolant fluid into the electric vehicle battery coolant system (not shown). An auxiliary port 152 may be provided, which may be used for draining the coolant manifold (for example, during maintenance) or for charging (introducing coolant) or for bleeding air from the manifold and/or battery coolant system. Also as shown in FIG. 1, the coolant manifold may comprise a mounting plate 148 which may incorporate one or more mounting standoffs 150. The mounting plate 148, for purposes of describing a total height (the depth-wise dimension of the assembled battery coolant heater assembly 100), is shown forming the (substantially planar, excluding the standoff tabs 150) bottom surface of the assembly 100, with the total height (depth) of the assembly 100 extending between the bottom surface 148 and the top surface 138.

Turning now to FIG. 2 is an exploded perspective view of an exemplary electric vehicle battery coolant heater assembly 200 comprising a significantly reduced height (depth) cover 202 (as compared to the cover 102 shown in FIG. 1) and sealing gasket 212 with integral pass-through electrical connections, according to various embodiments. As shown, the battery coolant heater assembly 200 comprises a component cover 202 that extends between a lengthwise end 210 and an opposite end 208, and widthwise between an edge 206 and 204, and depth-wise between a lower edge 206 and an upper (top) surface 226. In one embodiment, the edges 206 and 204 extending between ends 210 and 208 define a substantially planar opening sized and configured to receive a correspondingly sized gasket 212 for sealing the cover 202 to correspondingly sized substrate gasket mounting surfaces of a component mounting/attachment substrate, or, as shown, coolant manifold 214. The coolant manifold 214 preferably comprises a substantially planar heat transfer surface as shown in FIG. 1, that extends lengthwise within an area between an end 140 and an opposite end 142, and widthwise between edges corresponding with cover edges 206 and 204.

The cover 202, as shown in FIG. 2, is free from any through hole sized and adapted to receive a non-gasket-integral electrical harness connector such as the separate harness connector 118 shown in FIG. 1. The cover 202, as shown in FIG. 2, includes a depth (or height) between lower edge 206 and top surface 226 that is decreased by at least a portion of the depth-wise dimension 126-124 of the non-gasket-integral (separate harness) connector 118 shown in FIG. 1. In one embodiment, the cover 202 comprises a depth (height) that is reduced by an amount no less than the depth-wise dimension 126-124 of the separate harness connector, or no less than the depth-wise dimension 126-124 plus enough space to accommodate the extra wiring 122 associated with manufacturing requirements for assembly of a cover having a separate harness connector installed in a through hole in the cover.

The gasket 212 preferably comprises a molded or formed material sized and adapted to permit sealably enclosing the cover 202 and corresponding surfaces of the component mounting/attachment substrate, or coolant manifold 214. The gasket 212 preferably comprises a molded-in integral connector or molded-in harness mating connector shroud 216 having electrical conductors that extend from within the molded-in connector shroud 216 through the sealing portion of the gasket and continuing into the space enclosed by the cover and component mounting/attachment substrate or coolant manifold 214.

As shown in FIG. 2, electrical connections from the molded-in gasket-integral connector include pins 220 and 218, which press-fit to electrically connect with corresponding electrical connection pins 222 and 224, respectively, of the electrical component 106 (shown contacted to the heat transfer surface, such as heat transfer surface 154, of the coolant manifold 214).

Various aspects and embodiments of the gasket 212 are described in greater detail with respect to FIGS. 3-6. For example, FIG. 3 provides a perspective view of an exemplary gasket 300 with integral pass-through electrical connections, according to various embodiments, and FIG. 4 is a top plan view of the gasket with integral pass-through electrical connections shown in FIG. 3. The gasket 300, as shown, comprises a molded or formed carrier rail 302, having a width between an outer edge 306 and an inner edge 314, that extends between lengthwise edges 312 and 310, and between widthwise outer edges 306 and 308 so as to circumscribe an interior area 406. As best shown in FIG. 4, the interior area 406 is preferably sized and configured to circumscribe the surface area of the heat transfer surface 154 of the coolant manifold 214 occupied by the heating element or electrical component 106.

The carrier rail 302, in some embodiments, comprises a molded plastic carrier rail. In some embodiments, the gasket 300 comprises a carrier rail 302 and molded-in harness mating connector shroud 216 both made of molded or formed plastic, for example, injection molded plastic resin. The carrier rail 302 preferably comprises an inner rail 318 and an outer rail 320, with a channel depression 304 therebetween. The channel depression is sized to have a width and depth sufficient to accommodate an integrated or cure-in-place sealing bead (between the rails). The sealing bead is preferably adapted to provide fluid sealing between correspondingly mating surfaces of the cover 202 and coolant manifold 214. The carrier rail 302, channel depression, and sealing bead are preferably constructed so as to comprise two rails and a sealing bead there between for engagement with sealing surfaces of the cover and, identically, two rails and a sealing bead there between for engagement with engaging sealing surfaces of the component mounting/attachment substrate or coolant manifold. That is, the gasket rail 302 preferably comprises a symmetrical configuration whereby the rail structure engaging the sealing surfaces of the cover is the same (and mirror opposite in orientation) as the rail structure engaging the sealing surfaces of the coolant manifold.

Exemplary dimensions for the gasket 300 comprise a widthwise dimension 404 between outer edges 306 and 308 of approximately 110 mm, and a lengthwise dimension 402 from the (far) end/edge 310 to an outward most edge 328 of the molded-in connector shroud 216.

As shown in FIGS. 3 and 4, the molded-in harness mating connector shroud 216 extends outward from an edge 312 of the carrier rail 302 to the outward most edge 328 of the connector shroud 216. Protected within the connector shroud 216, as shown, are electrical conductors 324 and 326 which extend through the carrier rail into an interior connector 322. The interior connector 322, as shown, provides metallic pin circuitry adapted to provide electrical power or electrical signals via pins 220 and 218. As shown in FIGS. 3 and 4, the pins 220 and 218 may comprise spade type terminals (for press-fit connection with respectively mating metallic pin electrical connection pins 222 and 224 of the electrical component 106 as shown in FIG. 2).

The gasket, in various embodiments, may comprise other electrical configurations. For example, FIG. 5 provides a perspective view of an exemplary gasket 500 with integral pass-through electrical connections comprising wire conductors 502 and 504 instead of the spade type pins 220 and 218. FIG. 6 provides a top plan view of the gasket 500 with integral pass-through electrical connections shown in FIG. 5. The gasket may comprise a molded-in harness mating connector shroud that extends outward to an outward most edge 328 extending the same distance from the gasket edge 312 as in FIG. 4, however the molded-in connector shroud includes electrical conductors 508 and 510 that extend through the carrier rail 302 to an interior connector 506 within which metallic pin circuitry for conducting electrical power or electrical signals provides an interface transitioning the (flat metal) electrical conductor structure to a different type, in this case, as illustrated, to solid (round) wire conductors 502 and 504. The solid wire or wire wrap type internal electrical conductors may be used, for example, where the heating element or electrical component requiring electrical connection within the to-be-sealed enclosure requires connection with such sold type wire.

Other types of electrical connectors and conductors may be used. For example, the molded-in connector 216 is shown and described as a connector shroud within which flat metal electrical conductors extend outward away from the carrier rail of the gasket. However, in other embodiments, not shown, the molded-in connector shroud may comprise a connector shroud structure (and electrical conductor configuration) defined by customer harness connection requirements. For example, the molded-in shroud may comprise molded-in key notch structure, material thickness, electrical conductor width and thickness, etc. as defined by a particular customer's harness connection requirements. Likewise, configurations for electrical connection of the heating element or electrical component within the to-be-sealed enclosure may comprise spade type pins (such as the male spade (blade) terminals 222 and 224 shown in FIG. 2, and the female spade (double crimp) terminals 220 and 218 shown in FIGS. 2, 3, and 4), solid wire conductors (as in FIGS. 5 and 6), stranded wire conductors, insulated splice type connectors, forked connectors, ring terminals, or other types of connectors.

As described in various embodiments, a battery coolant heater assembly comprises: a coolant manifold having liquid coolant pathways and at least one heat transfer surface for transferring heat to liquid coolant flowable within the coolant manifold; at least one electric heater element thermally contacted to the at least one heat transfer surface; and a cover sealably enclosing the at least one heating element between the at least one heat transfer surface and the cover via a gasket between the cover and the at least one heat transfer surface, the at least one electric heater element electrically connected to at least one electrical connector extending through and formed integrally with the gasket. The coolant manifold may include a gasket mounting substrate circumscribing an area of the heat transfer surface and the electric heater element thermally contacted thereto. The gasket may be positioned upon the gasket mounting substrate so as to fully circumscribe the area of the heat transfer surface and the electric heater element positioned therein.

The cover preferably includes a gasket engaging surface sized to match the gasket and sealably engage with the gasket and the gasket mounting substrate there below. In one embodiment, the cover, due to electrical conductors extending through the at least one gasket-integral electrical connector extending through and formed integrally with the gasket, is free from any through hole sized and adapted to receive a non-gasket-integral electrical harness connector for providing power or electrical signals to the at least one heating element, such that a depth of the cover is decreased by at least a portion of a depth-wise dimension of the non-gasket-integral electrical harness connector.

In one embodiment, the gasket includes a carrier rail, wherein the carrier rail includes a pair of sides and a channel depression between the carrier rail sides. In one embodiment, the gasket includes a molded-in harness mating connector shroud, with the molded-in harness mating connector shroud molded into an outside edge of the gasket leaving the carrier rail oriented inward from the molded-in harness mating connector so that the molded-in harness matting connector shroud is exposed outside of space enclosed by the cover when sealably enclosing the at least one heating element between the at least one heat transfer surface and the cover. Preferably, an integrated or cure-in-place sealing bead is positioned within the channel depression of the carrier rail.

In some embodiments, metallic pin circuitry extends between electrical conductors exposed and oriented within the molded-in harness mating connector shroud through the carrier rail so that ends of the electrical conductors opposite the connector shroud are positioned within the space enclosed by the cover when sealably enclosing the at least one heating element, with the metallic pic circuitry adapted for providing electrical power or electrical signals to the at least one heating element. In one embodiment, the electrical conductors positioned within the space are adapted with spade terminal connectors for electrical connection with correspondingly mating spade terminal connectors of the at least one heating element. In one embodiment, the electrical conductors positioned with in the space are adapted with wire conductors for electrical connection with the at least one heating element.

As described with respect to various embodiments, a method of assembling an electric vehicle battery coolant heater assembly is provided, the method comprising: providing a coolant manifold including liquid coolant pathways and at least one heat transfer surface for transferring heat to liquid coolant flowable within the coolant manifold, at least one electric heater element thermally contactable to the at least one heat transfer surface, and a cover for sealably enclosing the at least one heating element between the at least one heat transfer surface and the cover via a gasket between the cover and the at least one heat transfer surface, the at least one electric heater element electrically connectable to at least one electrical connector extending through and formed integrally with the gasket; placing the at least one electric heater element upon the at least one heat transfer surface so that the at least one electric heater element is thermally contacted to the at least one heat transfer surface and heat transferable from the at least one heater element is transferable to the liquid coolant flowable within the coolant manifold; placing the gasket with the at least one integral electrical connector on the coolant manifold so as to circumscribe the at least one heater element and the at least one heat transfer surface there below; connecting electrical conductors extending from the at least one electrical connector extending through and formed integrally with the gasket with corresponding mating electrical connections of the at least one heater element; and placing the cover upon the gasket and sealably enclosing the at least one heating element between the at least one heat transfer surface and the cover.

In one embodiment, the method includes the coolant manifold having a gasket mounting substrate circumscribing an area of the heat transfer surface and the electric heater element thermally contacted thereto. In one embodiment, the method includes the gasket being positioned upon the gasket mounting substrate so as to fully circumscribe the area of the heat transfer surface and the electric heater element positioned therein. In one embodiment, the method includes the cover having a gasket engaging surface sized to match the gasket and sealably engage with the gasket and the gasket mounting substrate there below.

In one embodiment, the method includes that the cover, due to electrical conductors extending through the at least one gasket-integral electrical connector extending through and formed integrally with the gasket, is free from any through hole sized and adapted to receive a non-gasket-integral electrical harness connector for providing power or electrical signals to the at least one heating element, such that a depth of the cover is decreased by at least a portion of a depth-wise dimension of the non-gasket-integral electrical harness connector.

As described with respect to various embodiments, a gasket with at least one integral electrical connector adapted for a battery coolant heater assembly comprises: a gasket seal adapted to sealably enclose at least one battery coolant heating element between at least one heat transfer surface of a battery coolant manifold having liquid coolant pathways therewithin and a cover; and at least one electrical connector extending through and formed integrally with the gasket seal so as to provide power or electric signals to the at least one battery coolant heating element sealably enclosed within a space between the cover and the at least one heat transfer surface of the battery coolant manifold. In one embodiment, the gasket seal includes a carrier rail, the carrier rail having a pair of sides and a channel depression between the carrier rail sides. In one embodiment, the gasket includes a molded-in harness mating connector shroud, the molded-in harness mating connector shroud molded into an outside edge of the gasket seal leaving the carrier rail oriented inward from the molded-in harness mating connector so that the molded-in harness matting connector shroud is exposed outside of the space enclosed by the cover when sealeably enclosing the at least one heating element between the at least one heat transfer surface and the cover. Preferably, an integrated or cure-in-place sealing bead is positioned within the channel depression of the carrier rail.

The present inventors determined that a component cover such as the cover 202 in the assembly described with respect to FIG. 2 provides a battery coolant heater assembly that has significantly reduced packaging size requirements (due to the significantly height reduced cover). The present inventors determined such a design improves manufacturability of the component assembly by allowing full access to complete the electrical hookups before the cover is installed. The present inventors further determined that the design removes a secondary leak path (by eliminating the through hole in the cover and integrating the electrical connector into the sealing gasket between the cover and the coolant manifold), and reduces the number of required components (by eliminating the separate harness connector and gasket and additional wiring lengths associate therewith).

The technical effect of redesigning the cover of the battery coolant heater assembly as described herein, to eliminate the separate harness connector and structures required therefor, and integrating a molded-in connector and electrical power/signal pass-through into the gasket sealing the cover tot the coolant manifold, results in a reduced size assembly (requiring less (cover) material) having fewer required components, an easier to manufacture assembly (requiring less and simplified labor for manufacturing/assembling the unit) (i.e., simplified/improved manufacturability), and an assembly having fewer potential leak points (due to elimination of the need for through hole in the cover and a separate harness connector).

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise" and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

What is claimed is:

1. A battery coolant heater assembly comprising:
    a coolant manifold having liquid coolant pathways and at least one heat transfer surface for transferring heat to liquid coolant flowable within the coolant manifold;
    at least one electric heater element thermally contacted to the at least one heat transfer surface;
    at least one electrical connector formed integrally with a gasket and configured to provide electrical energy to the at least one electrical heater element; and a cover sealably enclosing the at least one heating element between the at least one heat transfer surface and the cover via the gasket positioned therebetween, the at least one electric heater element electrically connected to the at least one electrical connector extending through and formed integrally with the gasket, wherein the at least one electrical connector extends from outside of an area sealably enclosed by the cover, the gasket, and the at least one heat transfer surface of the coolant manifold, to inside of the area sealably enclosed by the cover, the gasket, and the at least one heat transfer surface of the coolant manifold.

2. The assembly of claim 1, wherein the coolant manifold includes a gasket mounting substrate circumscribing an area of the heat transfer surface and the electric heater element thermally contacted thereto.

3. The assembly of claim 2, wherein the gasket is positioned upon the gasket mounting substrate so as to fully circumscribe the area of the heat transfer surface and the electric heater element contacted thereto, and wherein the cover includes a gasket engaging surface sized to match the gasket and sealably engage with the gasket and the gasket mounting substrate there below.

4. The assembly of claim 1, wherein the cover, due to electrical conductors extending through the at least one gasket-integral electrical connector extending through and formed integrally with the gasket, is free from any through hole for providing power or electrical signals to the at least one heating element, such that a depth of the cover is decreased.

5. The assembly of claim 1, wherein the gasket includes a carrier rail, the carrier rail having a pair of sides and a channel depression between the carrier rail sides.

6. The assembly of claim 5, wherein the gasket includes a molded-in harness mating connector shroud, the molded-in harness mating connector shroud molded into an outside edge of the gasket leaving the carrier rail oriented inward from the molded-in harness mating connector so that the molded-in harness matting connector shroud is exposed outside of space enclosed by the cover when sealably enclosing the at least one heating element between the at least one heat transfer surface and the cover.

7. The assembly of claim 5, wherein an integrated or cure-in-place sealing bead is positioned within the channel depression of the carrier rail.

8. The assembly of claim 6, wherein metallic pin circuitry extends between electrical conductors exposed and oriented within the molded-in harness mating connector shroud through the carrier rail so that ends of the electrical conductors opposite the connector shroud are positioned within the space enclosed by the cover when sealably enclosing the at least one heating element, with the metallic pic circuitry adapted for providing electrical power or electrical signals to the at least one heating element.

9. The assembly of claim 8, wherein the electrical conductors positioned within the space are adapted with spade terminal connectors for electrical connection with correspondingly mating spade terminal connectors of the at least one heating element.

10. The assembly of claim 9, wherein the electrical conductors positioned with in the space are adapted with wire conductors for electrical connection with the at least one heating element.

11. A battery coolant heater assembly comprising:
a coolant manifold having liquid coolant pathways and at least one heat transfer surface for transferring heat to liquid coolant flowable within the coolant manifold;
at least one electric heater element thermally contacted to the at least one heat transfer surface; and
a cover sealably enclosing the at least one heating element between the at least one heat transfer surface and the cover via a gasket between the cover and the at least one heat transfer surface, the at least one electric heater element electrically connected to at least one electrical connector extending through and formed integrally with the gasket, wherein the gasket includes a carrier rail, the carrier rail having a pair of sides and a channel depression between the carrier rail sides.

12. The assembly of claim 11, wherein the gasket includes a molded-in harness mating connector shroud, the molded-in harness mating connector shroud molded into an outside edge of the gasket leaving the carrier rail oriented inward from the molded-in harness mating connector so that the molded-in harness matting connector shroud is exposed outside of space enclosed by the cover when sealably enclosing the at least one heating element between the at least one heat transfer surface and the cover.

13. The assembly of claim 11, wherein an integrated or cure-in-place sealing bead is positioned within the channel depression of the carrier rail.

14. The assembly of claim 12, wherein metallic pin circuitry extends between electrical conductors exposed and oriented within the molded-in harness mating connector shroud through the carrier rail so that ends of the electrical conductors opposite the connector shroud are positioned within the space enclosed by the cover when sealably enclosing the at least one heating element, with the metallic pic circuitry adapted for providing electrical power or electrical signals to the at least one heating element.

15. The assembly of claim 14, wherein the electrical conductors positioned within the space are adapted with spade terminal connectors for electrical connection with correspondingly mating spade terminal connectors of the at least one heating element.

16. The assembly of claim 15, wherein the electrical conductors positioned with in the space are adapted with wire conductors for electrical connection with the at least one heating element.

17. A gasket with at least one integral electrical connector adapted for a battery coolant heater assembly, the gasket comprising:
a gasket seal adapted to sealably enclose at least one battery coolant heating element between at least one heat transfer surface of a battery coolant manifold having liquid coolant pathways therewithin and a cover; and
at least one electrical connector extending through and formed integrally with the gasket seal so as to provide power or electric signals to the at least one battery coolant heating element sealably enclosed within a space between the cover and the at least one heat transfer surface of the battery coolant manifold.

18. The gasket of claim 17, wherein the gasket seal includes a carrier rail, the carrier rail having a pair of sides and a channel depression between the carrier rail sides.

19. The gasket of claim 18, wherein the gasket includes a molded-in harness mating connector shroud, the molded-in harness mating connector shroud molded into an outside edge of the gasket seal leaving the carrier rail oriented inward from the molded-in harness mating connector so that the molded-in harness matting connector shroud is exposed outside of the space enclosed by the cover when sealably enclosing the at least one heating element between the at least one heat transfer surface and the cover.

20. The gasket of claim 19, wherein an integrated or cure-in-place sealing bead is positioned within the channel depression of the carrier rail.

\* \* \* \* \*